United States Patent [19]

Stack

[11] Patent Number: 4,722,138

[45] Date of Patent: Feb. 2, 1988

[54] CUTTING AND INSULATION STRIPPING APPARATUS FOR ELECTRICAL CONDUCTOR

[75] Inventor: Paul D. Stack, Cadillac, Mich.

[73] Assignee: Cooper Industries, Houston, Tex.

[21] Appl. No.: 924,163

[22] Filed: Oct. 29, 1986

Related U.S. Application Data

[63] Continuation of Ser. No. 759,629, Jul. 26, 1985, abandoned.

[51] Int. Cl.$^4$ .............................................. H02G 1/12
[52] U.S. Cl. .................................................. 30/90.11
[58] Field of Search ........................ 81/9.4, 9.44, 9.51; 30/90.1, 91.2

[56] References Cited

U.S. PATENT DOCUMENTS 3,581,608  6/1971  Baker .
3,880,022  4/1975  Miller ..................................... 81/9.4

Primary Examiner—Roscoe V. Parker
Attorney, Agent, or Firm—E. E. Scott; A. R. Thiele

[57] ABSTRACT

A manually actuated electrical conductor wire insulation cutting and stripping apparatus has an elongated housing adapted to be mounted on a conductor wrapping tool or connected to a pistol grip type handle. The housing supports a wire cut off blade assembly and an insulation cutting and stripping blade assembly which are actuated simultaneously by an elongated shaft extending in and supported by the housing and connected to a manual actuating lever. The insulation cutting and stripping blades are retained on the housing at one end thereof by a removable cover member which permits interchanging insulation cutting and stripping blades without major disassembly of the apparatus. The wire cut off blades are mounted on a movable support member and one of the wire cut off blades retains the other blade in a recess formed in the support member and connected to the shaft for rotation therewith.

10 Claims, 8 Drawing Figures

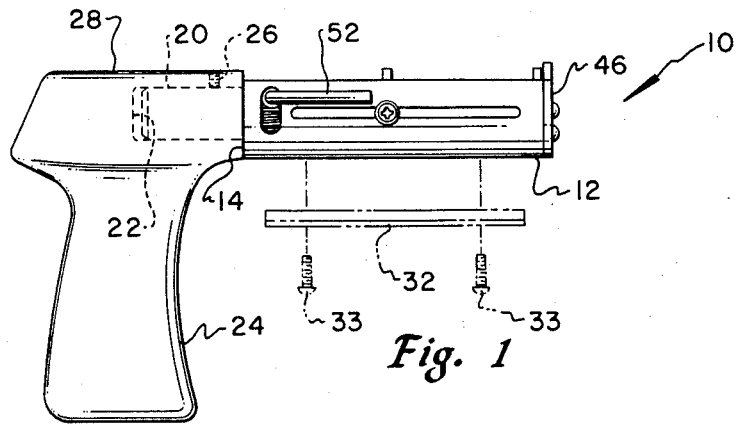
Fig. 1
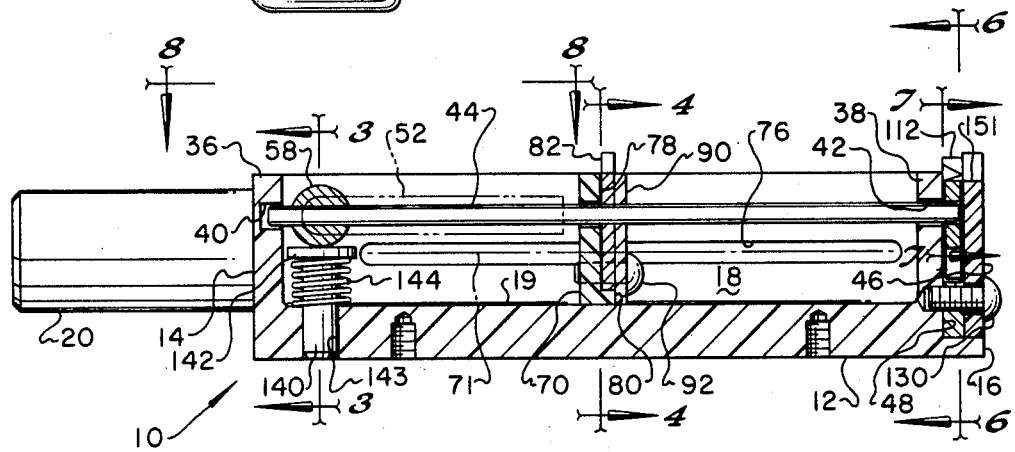
Fig. 2
Fig. 3
Fig. 8

CUTTING AND INSULATION STRIPPING APPARATUS FOR ELECTRICAL CONDUCTOR

This application is a continuation of application Ser. No. 759,629, filed July 26, 1985 and now abandoned.

BACKGROUND OF THE INVENTION

1. Field of the Invention

The present invention pertains to a manually actuated wire cutting and insulation stripping device for electrical conductor wire.

2. Background

In the art of manually actuated tools for cutting and stripping predetermined lengths of insulation from electrical conductor wire there has been a desire to simplify the construction of such device without sacrificing the operating characteristics and the ease with which the tool may be utilized to perform its intended function. For example, U.S. Pat. No. 3,581,608 to William J. Baker and assigned to the assignee of the present invention pertains to certain improvements in manually actuated devices of the general type described herein.

It has been determined in the further development of electrical conductor insulation cutting and stripping devices that entirely satisfactory wire and insulation cutting action may be accomplished without requiring that both blades of the insulation cutting and wire cutting blade pair be movable relative to a support frame. Moreover, it has been determined that wire and insulation cutting blades may be made with sufficient precision, particularly with the improvements of the present invention, so as to not require that an external adjustment feature be provided to limit the movement of the blades toward or away from each other. With these desiderata and improvements in mind several other improvements in the configuration of wire insulation cutting and stripping apparatus have also been accomplished with the insulation cutting and stripping apparatus of the present invention.

SUMMARY OF THE INVENTION

The present invention provides an improved insulation cutting and stripping apparatus for use in cutting and stripping predetermined lengths of insulation from flexible electrical conductor wire.

In accordance with an important aspect of the present invention there is provided a manually actuated insulation cutting and stripping apparatus which is mechanically uncomplicated and is easily actuated when supported on either a pistol grip type handle or when mounted on an electrical conductor wrapping tool or the like. The apparatus includes an elongated generally cylindrical housing which supports a shaft for actuation of a wire cut off blade and an insulation cutting and stripping blade, both blades being movable relative to cooperating blades which are fixed with respect to the housing. The actuating shaft is connected to a digitally operable lever of actuating handle which is configured for ease of operation.

In accordance with another important aspect of the present invention an improved insulation cutting and stripping apparatus is provided wherein respective sets of wire cutting and insulation cutting and stripping blades are supported in such a way that the blades may be easily interchanged with blades of different configurations for use of the apparatus with various wire gauges. In particular, the insulation stripping blades are mounted on a forward portion of the apparatus housing for easy removal and replacement with blades adapted for use with diffeent wire gauges or in the event that a set of blades needs replacement due to wear or damage.

In accordance with still further advantageous aspects of the present invention an insulation cutting and stripping device is provided wherein the length of insulation to be cut and stripped from a wire end portion is selectively controlled. The wire cutting and the insulation cutting and stripping blades are journalled in respective housing parts and supported thereby in a unique manner. The apparatus is provided with a housing part which automatically retains the stripped pieces of insulation as well as small pieces of wire which have been cut to determine the length of insulation which is being stripped, and the apparatus is constructed with substantially fewer parts than prior art apparatus.

The abovementioned advantages as well as other superior aspects of the present invention will be recognized by those skilled in the art upon reading the detailed description which follows in conjunction with the drawing.

BRIEF DESCRIPTION OF THE DRAWING

FIG. 1 is a side elevation of the improved insulation cutting and stripping apparatus of the present invention assembled with a pistol grip type support housing;

FIG. 2 is longitudinal central section view of the insulation stripping apparatus;

FIG. 3 is a section view taken from the line 3—3 of FIG. 2;

FIG. 8 is a detail view taken from the line 8—8 of FIG. 2.

DESCRIPTION OF THE PREFERRED EMBODIMENT

Figure 4:
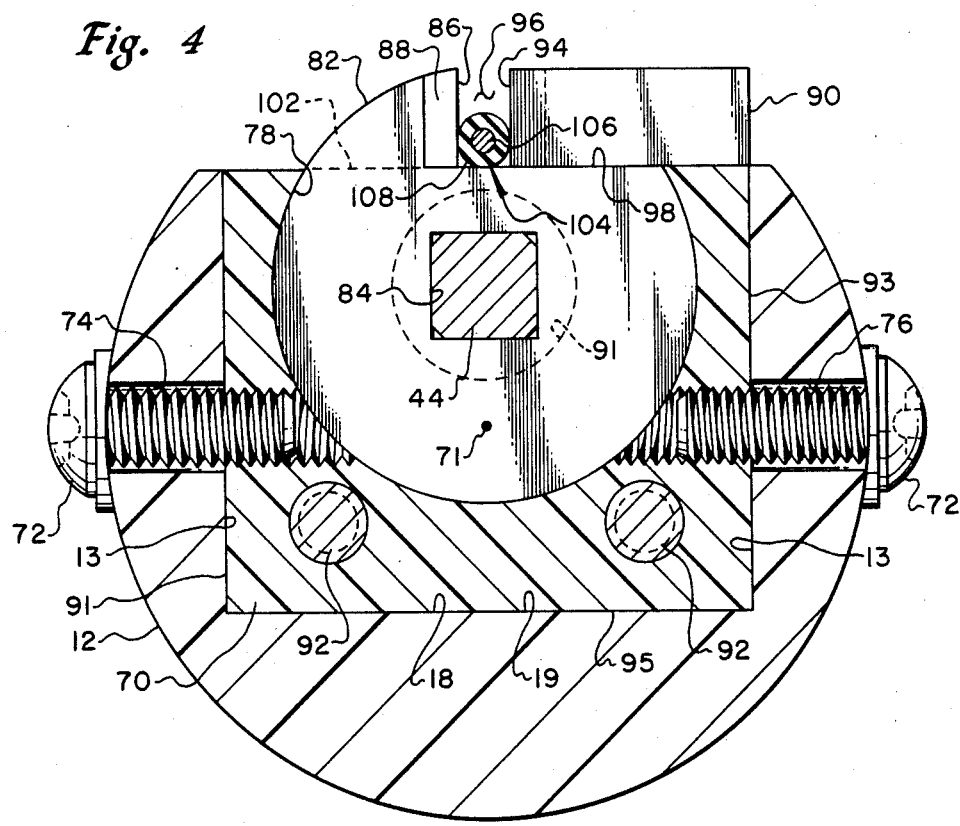
FIG. 4 is a section view taken from the line 4—4 of FIG. 2.

In the description which follows like parts are marked throughout the specification and drawing with the same reference numerals, respectively. The drawing figures are not necessarily to scale and certain features of the invention may be shown exaggerated in scale in the interest of clarity.

Referring to FIGS. 1 through 3 and 8, there is illustrated an improved cutting and insulation stripping apparatus for electrical conductor wire, generally designated by the numeral 10. The apparatus 10 includes an elongated somewhat cylindrical housing 12 having opposed end faces 14 and 16 and an elongated generally rectangular box shaped recess 18 formed therein and defined in part by opposed side walls 13 and a bottom wall 19. The housing 12 also includes a support pin section 20 projecting from the end face 14 and adapted to be received in a bore 22, FIG. 1, formed in a pistol grip type handle, generally designated by the numeral 24. The pin section 20 is operable to be releasably retained in the bore 22 by a lock screw 26 threaded into a suitable hole in the barrel portion 28 of the handle 24. The apparatus 10 may also be utilized with a mounting bracket 32 which may be removably secured to the bottom of the housing 12 by conventional threaded fasteners 33.

As shown in FIG. 2, the recess 18 is also formed by opposed end walls 36 and 38 which are provided with respective openings 40 and 42 forming bearing bores for receiving an elongated somewhat square cross section shaped shaft 44. The shaft 44 is disposed in the respective bores 40 and 42 for rotation therein and is retained in the bores by a generally cylindrical end cover 46 which is disposed in a recess 48 formed in the end wall 38 and opening to the transverse end face 16 of the housing 12.

The shaft 44 is operably connected to an actuating lever 52 having a shank portion 54 and a handle portion 56 integral with the shank portion but bent at substantially right angles thereto. The actuating lever 52 includes a generally cylindrical hub 58 having a polygonal shaped bore 60 formed therein, FIG. 3, which is only slightly larger than the cross sectional dimensions of the shaft 44 whereby the shaft may extend through the bore 60 and, in response to movement of the lever 52, the shaft 44 may be rotated about its longitudinal axis. The shank 54 projects through a slot 62 formed in the side wall of the housing 12. A slot 64 is formed opposite the slot 62 whereby the operating lever 52 may be reversibly disposed on the housing 12 for operation in either a "left hand" or "right hand" mode.

Referring now primarily to FIGS. 2 and 4, the apparatus 10 includes an improved arrangement of opposed wire cut off blades including a generally rectangular blade support member 70 dimensioned to be slidably disposed in the recess 18. The member 70 is secured in a selected position with respect to the longitudinal central axis 71 of the housing 12 by opposed fasteners 72 which extend through opposed co-extensive slots 74 and 76 which open from the recess 18 to the exterior of the housing 12 along opposed longitudinal sides thereof. The cut off blade support member 70 includes a generally cylindrical recess 78 formed therein and intersecting a generally planar face 80, FIG. 2, of the support member, A movable wire cut off blade 82 is operably secured to the shaft 44 and includes a polygonal shaped bore 84 formed therein, FIG. 4, and conforming substantially to the cross sectional shape of the shaft 44 whereby, in response to rotation of the shaft about its central axis, the blade 82 is moved with the shaft. The blade 82 has a somewhat radially extending cutting edge 86 formed by a bevelled surface 88 on the blade 82 and extending from one face of the blade to the other. The blade 82 is dimensioned to have a thickness such that it may be disposed in the recess 78 for free rotation therein and is retained in the recess by an opposed generally rectangular shaped wire cutting blade member 90. The blade member 90 has opposed side surfaces 91 and 93 and a bottom surface 95 to permit locating the blade by the side walls 13 and bottom wall 19 of the housing 12.

Figure 5:
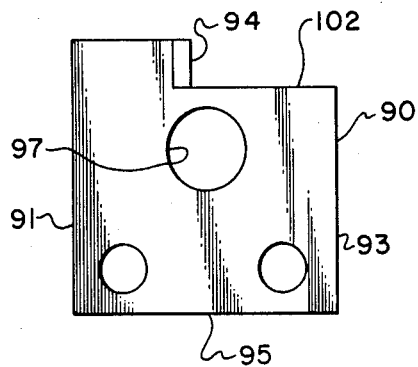
FIG. 5 is a detail plan view of one of the wire cutoff blades.

The blade member 90 is also adapted to be secured to the face 80 of the support member 70 by suitable fasteners 92 and the blade member 90 includes a cutting edge 94 which extends generally parallel to the cutting edge 86, when the blade 82 is in a retracted position to form a recess 96, FIG. 4, between the cutting edges 86 and 94 and delimited by a generally transverse surface 98 formed on the blade member 82. The blade member 90 also includes a generally transverse flat surface 102, see FIG. 5 also, which is substantially coplanar with the surface 98 to assist in supporting a portion of an insulated conductor wire 104 having a metal conductor portion 106 and a suitable insulation jacket 108 formed there around. The blade member 90 also has a central bore 97 formed therein to provide clearance for the shaft 44.

Figure 6:
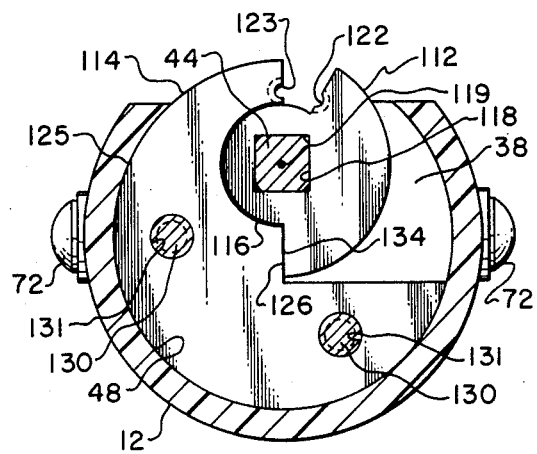
FIG. 6 is a section view taken from the line 6—6 of FIG. 2.
Figure 7:
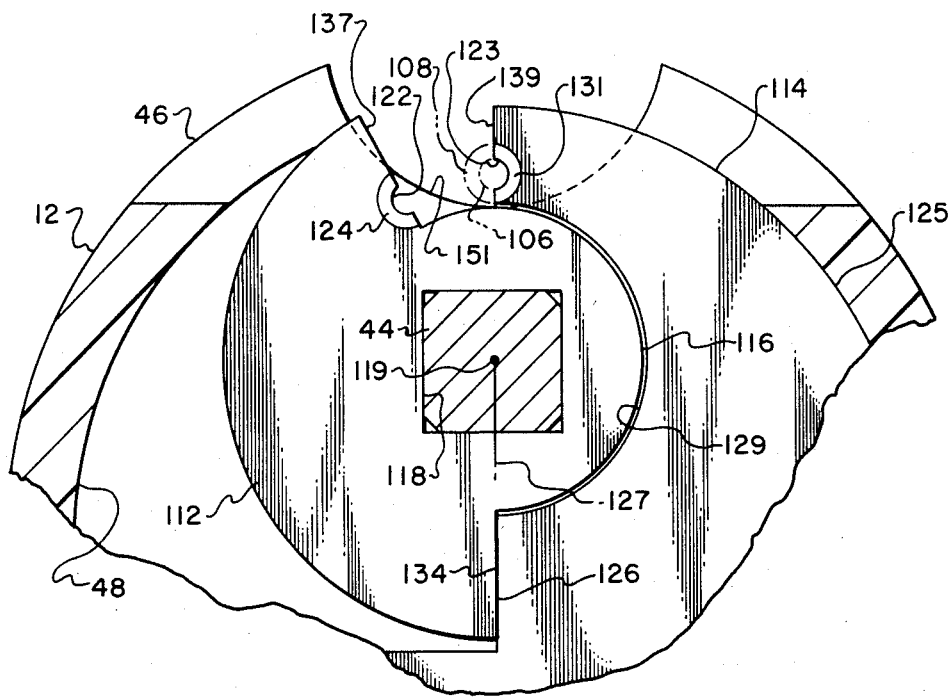
FIG. 7 is a detail section view taken from the line 7—7 of FIG. 2.

Referring further to FIG. 2 together with FIGS. 6 and 7, the apparatus 10 comprises an improved arrangement of opposed insulation cutting and stripping blades comprising blade members 112 and 114. The blade member 112 includes a partial cylindrical hub portion 116 and a polygonal bore 118 formed symmetrical about the central axis 119 of the hub portion 116. The shaft 44 extends through the bore 118 and is in registration with the sides of the bore for supporting the blade 112 and rotating the blade in unison with rotation of the shaft 44. The blade 112 includes an insulation cutting edge generally designated by the numeral 122 which is formed in part by a somewhat frusto conical surface 124, FIG. 7. A stop surface 126 is formed on the blade 112 and preferably lies on a radial line 127 extending from the axis 119. The blade member 114 includes an outer circumferential cylindrical surface 125 dimensioned to permit fitting the blade member 114 in the recess 48 so as to properly locate the blade relative to the housing 12. The blade member 114 also includes a cylindrical recess portion 129 to provide clearance for the hub portion 116 of the blade 112. The blade 114 further includes an insulation cutting edge 123 formed by a frusto-conical surface 131, FIG. 7. The blade 114 is adapted to be supported in the recess 48 and retained therein by the cover member 46. The cover member 46 is releasably secured to the housing 12 by one or more threaded fasteners 130 which extend through suitable clearance holes 131 in the blade member 114 and are threadedly engaged with the housing end wall 38.

Referring further to FIG. 7, the blades 112 and 114 include respective cooperating abutting surfaces 126 and 134 which, when engaged with each other, lie on the radial line 127 extending from the axis 119. The surfaces 126 and 134 limit the movement of the blade 112 toward its open or conductor wire receiving position illustrated in FIG. 7 in response to movement of the shaft 44. Referring briefly again to FIG. 3, the shaft 44 and the lever 52 are biased into the position illustrated in the drawing figures by a pin 140 having a head portion 142 engageable with the lever hub 58 and also operable to retain a coil spring 144 between the bottom wall 19 of the recess 18 and the hub. The pin 140 is freely movable in a bore 143 formed in the housing 12. The pin 140 is constantly biased in an upward direction, viewing FIGS. 2 and 3, to urge the lever member 52 to assume the position illustrated wherein the blade members 82 and 112 move to their respective open positions. In response to rotation of the lever member 52 in a counter clockwise direction, viewing FIG. 3, the pin 140 is forced downward into the bore 143 as the shaft 44 rotates to move the blades 82 and 112 in unison toward a closed position. As the blades 82 and 112 are moved to the closed position a conductor wire such as the insulated conductor 104 disposed in the slot 96 will be completely severed as the blade cutting edges 86 and 94 close over each other. The blade 112 will rotate until a surface 137 engages a cooperating surface 139 formed on the blade 114 whereby the cutting edge 134 on the blade 114 cooperates with the cutting edge 122 to sever the conductor insulation jacket, but the cutting edges are of sufficient diameter to permit the selected gauge of wire 106 to be disposed in an opening formed between the edges 122 and 123 so that the wire is not nicked or damaged. Accordingly, the closing movement of the blades is limited by the engagement of the surface 137 with the surface 139.

In the operation of the apparatus 10, a suitable length of conductor wire 104 is presented to the apparatus by placing a free end portion in the slot 96 between the blade cutting edges 86 and 94. Preferably, the lever 52 is depressed slightly to engage the insulation jacket 108 with the blade cutting edges sufficiently to retain the wire clamped between the blades 82 and 90 whereupon the wire is then stretched lightly and placed between the cutting edges 122 and 123 of the blades 112 and 114, respectively. The location of the surfaces 122 and 123 with respect to the peripheral surface of the hub 116 is such that the wire conductor 106 will be nested in the space between the surfaces 122 and 123 as the shaft 44 is rotated fully toward the closed position which is in a clockwise direction, viewing FIG. 7.

The cover member 46 includes an arcuate recess 151 formed to provide a surface which is operable to assist in centering or aligning the conductor 104 with the blade cutting edges 122 and 123. When the surfaces 137 and 139 abut each other the blades 112 and 114 are fully closed and the insulation 108 is substantially severed fully circumferentially around the wire 106. The wire 106 will then be stripped by pulling the conductor 104 axially away from the end face 16 to strip the piece of insulation between the cutting blade set comprising the blades 82 and 90 and the insulation cutting blade set comprising the blades 112 and 114. The length of wire which has been stripped of insulation is also automatically determined by cutting off any additional length of wire extending between the blades 82 and 90 and the end wall 36 of the housing 12. Any short piece of wire which has been completely severed will fall into the recess 18 as will the piece of stripped insulation whereby this material is retained and is not likely to fall into the work area at which the apparatus 10 is being used. Moreover, the predetermined length of insulation 108 which is to be stripped can be easily adjusted by loosening the fasteners 72 and sliding the support member 70 within the recess 18 to a predetermined position with respect to the insulation cutting blades 112 and 114 the retightening the fasteners 72 when the support member is placed in its selected position.

In accordance with an important aspect of the invention the blades 112 and 114 may be easily interchanged with blades adapted for use with conductor wire of different diameters or gauges. By merely removing the cover member 46 the blades 112 and 114 may be interchanged with blades having recesses or cutting edges corresponding to the cutting edges 122 and 123 adapted to use with wire of different diameters. The new blades are merely replaced and the cover 46 replaced without disassembling any other part of the apparatus 10.

If it is desired to replace the blades 82 and 90 the cover 48 is removed and the shaft 44 slid axially away from the end wall 36 until it passes out of the hub 58, the opening 84 and the bore 97. The support member 70 may then be removed from the recess 18 and the blade members 82 and 90 removed from the support member and replaced with new blades, if desired. The apparatus 10 may then be reassembled in substantially the reverse order to that just described.

Moreover, if it is desired to utilize the apparatus 10 for left-handed operation the lever member 52 may be reversed in its position and extended through the slot 64, the support member 70 would also require to be reversed in its position in the recess 18 and a set of cutting blades corresponding to the blades 112 and 114 but comprising mirror images of these blades would be required to be substituted for the blades 112 and 114. The apparatus 10 may be manufactured using conventional engineering materials such as metal or plastic for the housing 12, the cover member 46 and the support member 70. The lever 52 and the shaft 44 may be made of metal or plastic materials and the respective cutting blades are preferably formed of hardened and ground carbon or stainless steel.

Although a preferred embodiment of the present invention has been described in detail herein those skilled in the art will recognize that various substitutions and modifications may be made to the specific features described without departing from the scope and spirit of the invention as recited in the appended claims.

What I claim is:

1. An apparatus for cutting and stripping a predetermined length of insulation from a flexible electrical conductor wire comprising:

a support housing including an elongated box-shaped recess, defined by opposed side walls, a first end wall and a cover member, said cover member positioned opposite said end wall;

a stationary insulation cutting blade constructed and arranged to be secured at one end of said support housing;

a rotatable insulation cutting blade operatively disposed with respect to said stationary insulation cutting blade;

means for substantially circumferentially severing the insulation, said means for substantially circumferentially severing the insulation operatively associated with said stationary insulation cutting blade and said rotatable insulation cutting blade;

said stationary insulation cutting blade and said rotatable insulation cutting blade being removably mounted within said support housing, said removable mounting of said insulation cutting blades being accomplished by removing said cover member, replacing said insulation cutting blades and replacing said cover member a selectively positionable wire cutoff blade support member disposed in said box-shaped recess;

a stationary wire cutoff blade supported by said wire cutoff blade support member;

a rotatable wire cutoff blade supported in said box-shaped recess operatively positioned with respect to said stationary wire cutoff blade;

said stationary wire cutoff blade and said rotatable wire cutoff blade being removably mounted within said support housing;

an elongated shaft extending between said end wall and said cover member and supported by said support housing for rotation relative thereto, said elongated shaft being operatively connected to said rotatable insulation cutting blade and said rotatable wire cutoff blade to effect a substantially circumferential severing of said insulation at a location spaced from the end of said conductor wire whereby said removable mounting of said wire cutoff blades may be accomplished by removing said cover member, sliding said elongated shaft away from said end wall, replacing said wire cutoff blades, reengaging said elongated shaft with said end wall and replacing said cover member; and a lever member connected to said elongated shaft and extending externally of said housing to rotate said elongated shaft for simultaneously cutting off said wire and said insulation at predetermined locations.

2. The apparatus as defined in claim 1, wherein:
said support housing further includes:
a second end wall opposite said first end wall;
a recess formed in one of said opposed end walls for receiving said insulation cutting blades; and
said cover member adapted to be secured to said housing for both retaining said insulating cutting blades in said recess and retaining said movable cutting blade to said elongated shaft.

3. The apparatus as defined in claim 1, further including:
cam means disposed in said support housing, said cam means constructed and arranged to be engageable with said lever member for urging said lever member and said elongated shaft to a position whereby said blades are in an open configuration.

4. The apparatus as defined in claim 3, further including:
spring means engageable with said cam means for urging said cam means to a position where said lever member is biased toward a position where said blades are in an open configuration.

5. The apparatus as defined in claim 1, wherein:
said elongated shaft includes a portion having polygonal cross-sections;
said movable cutting blades each including complimentary polygonal openings formed therein for receiving said shaft;
whereby said rotatable cutting blades can be rotated by said elongated shaft.

6. The apparatus as defined in claim 1, wherein:
said lever member includes a hub portion, said hub portion having a bore complimentary to said elongated shaft for receiving said elongated shaft whereby said elongated shaft can be rotated by the movement of said lever member.

7. The apparatus as defined in claim 6, wherein:
said lever member extends through a slot formed in said support housing and is retained on said elongated shaft by means defining a slot.

8. The apparatus as defined in claim 6, wherein:
said support housing further includes: a second end wall opposite said first end wall;
said elongated shaft is journalled in respective bores formed in said opposed end walls and is retained in said bores by said removable cover member secured to said support housing.

9. The apparatus as defined in claim 1, including:
a support pin projecting from one end of said support housing, said support pin adapted to be operatively engaged by a pistol grip type handle.

10. An apparatus for cutting and stripping a predetermined length of insulation from a flexible electrical conductor wire comprising:
a support housing including an elongated recess defined in part by a bottom wall opposed side walls, an end wall and a cover member, said cover member positioned opposite said end wall;
a stationary insulation cutting blade member constructed and arranged to fit within one end of said support housing;
a rotatable insulation cutting blade operatively disposed with respect to said stationary insulation cutting blade on the same end of said support housing as said stationary insulation cutting blade;
means for substantially circumferentially severing the insulation operatively associated with said stationary insulation cutting blade and said rotatable insulation cutting blade;
said stationary insulation cutting blade and said rotatable insulation cutting blade being removably mounted within said support housing, said removable mounting of said insulation cutting blades being accomplished by removing said cover member, replacing said insulation cutting blades and replacing said cover members;
a wire cutoff blade support member disposed in said elongated recess, said wire cutoff blade support member adapted to be selectively positionable there-in between said opposed end walls;
a stationary wire cutoff blade secured to said wire cutoff blade support member;
a rotatable wire cutoff blade secured to said wire cutoff blade support member by said stationary cutoff blade;
said stationary wire cutoff blade and said rotatable wire cutoff blade being removably mounted;
an elongated shaft extending between said said end wall and said cover member and supported by said housing for rotation relative thereto, said elongated shaft being operatively connected to said rotatable insulation cutting blade and said rotatable wire cutoff blade for rotating said rotatable insulation cutting blade and said rotatable wire cutoff blade together for determining the length of a piece of insulation to be stripped and cutting said insulation at a location spaced from one end of said connector wire, said removable mounting of said wire cutoff blades being accomplished by removing said cover member, sliding said elongated shaft away from said end wall, replacing said wire cutoff blades, re-engaging said elongated shaft with said end wall and replacing said cover member; and
lever means connected to said elongated shaft for rotating said elongated shaft for simultaneously cutting off said wire and said insulation at predetermined locations relative to the end of said wire.

* * * * *